(12) United States Patent
Ling

(10) Patent No.: US 7,561,554 B2
(45) Date of Patent: Jul. 14, 2009

(54) METHOD AND SYSTEM FOR DETECTING ROGUE ACCESS POINTS AND DEVICE FOR IDENTIFYING ROGUE ACCESS POINTS

(75) Inventor: Kin-Leung Ling, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 593 days.

(21) Appl. No.: 11/323,267

(22) Filed: Dec. 30, 2005

(65) Prior Publication Data
US 2007/0058598 A1 Mar. 15, 2007

(30) Foreign Application Priority Data
Sep. 9, 2005 (TW) .............................. 94131010 A

(51) Int. Cl.
*H04W 4/00* (2006.01)
(52) U.S. Cl. .................... 370/338; 370/216; 370/230; 370/242; 370/328; 370/400; 370/401; 455/41.1; 455/41.2; 455/41.3; 709/209; 709/221; 379/14.01; 379/15.02; 379/15.05
(58) Field of Classification Search ............... 370/216, 370/230, 242, 328, 338, 400, 401; 455/41.1–41.3; 709/209, 221
See application file for complete search history.

(56) References Cited

U.S. PATENT DOCUMENTS

2004/0023640 A1    2/2004   Ballai
2005/0171720 A1*   8/2005   Olson et al. .................. 702/121
2006/0068811 A1*   3/2006   Adya et al. .............. 455/456.2
2006/0193258 A1*   8/2006   Ballai .......................... 370/230
2006/0193284 A1*   8/2006   Stieglitz et al. ............. 370/328
2006/0193299 A1*   8/2006   Winget et al. ............... 370/338
2006/0215582 A1*   9/2006   Castagnoli et al. .......... 370/254

OTHER PUBLICATIONS

"Rogue Access Point Detection: Automatically Detect and Manage Wireless Threats to Your Network", White Paper, 2004, 7 pages, Proxim Corporation.

* cited by examiner

Primary Examiner—Rafael Pérez-Gutiérrez
Assistant Examiner—Nimesh Patel

(57) ABSTRACT

A system for detecting rogue access points (APs) includes a detecting station (130) and a device for identifying rogue access points (110). The detecting station scans access points and stations associated with the access points, in order to compile an AP list and an association list within the scope of the detecting station, and transmits the AP list and the association list. The device for identifying rogue access points (110) includes a receiving module (112) and a determining module (114). The receiving module receives the AP list and the association list. The determining module determines whether each access point in the AP list is a rogue access point. A related method is also provided.

18 Claims, 3 Drawing Sheets

METHOD AND SYSTEM FOR DETECTING ROGUE ACCESS POINTS AND DEVICE FOR IDENTIFYING ROGUE ACCESS POINTS

BACKGROUND

1. Field of the Invention

The invention relates to methods and systems for detecting access points, and particularly to methods and systems for detecting rogue access points and a device for identifying rogue access points.

2. Related Art

When an organization such as a company uses a traditional wired network communication and computer system, it is generally not easy for network intruders to gain access into the company's network. For instance, the network intruders may need to gain physical access inside the company's building, and then find an Ethernet port from where they can electronically obtain confidential information of the company. This physical boundary provides a certain level of protection against network intruders.

When a company uses a wireless network, the network intruders do not necessarily have to physically get inside the company's building in order to access the company's network. The network intruders only need to be present within the scope of the wireless network, and then gain access to the company's confidential information through a wireless connection.

One form of wireless security breach occurs when network intruders put an access point (AP) near to or in a company's building. An employee of the company may unknowingly connect the unauthorized access point to the company's network. The network intruders can then try to gain access to the employee's confidential information via the unauthorized access point. This kind of unauthorized access point is commonly known as a "rogue access point" or "rogue AP." Therefore, a method for detecting rogue access points is needed in order to protect an organization's confidential information.

SUMMARY

An exemplary embodiment of the present invention provides a method for detecting rogue access points (APs). The method includes the steps of: providing a detecting station and a device for identifying rogue access points; scanning access points and stations associated with the access points by the detecting station, in order to compile an AP list and an association list within the scope of the detecting station; transmitting the AP list and the association list from the detecting station to the device for identifying rogue access points; and determining whether each access point in the AP list is a rogue access point, according to the AP list and the association list, by the device for identifying rogue access points.

Another exemplary embodiment of the present invention provides a system for detecting rogue access points. The system includes a detecting station and a device for identifying rogue access points. The detecting station scans access points and stations associated with the access points, in order to compile an AP list and an association list within the scope of the detecting station, and transmits the AP list and the association list. The device for identifying rogue access points includes a receiving module and a determining module. The receiving module receives the AP list and the association list. The determining module determines whether each access point in the AP list is a rogue access point.

Still another exemplary embodiment of the present invention provides a device for identifying rogue access points. The device includes a receiving module and a determining module. The receiving module receives an AP list and an association list. The determining module determines whether each access point in the AP list is a rogue access point according to the AP list and the association list.

Other advantages and novel features will become more apparent from the following detailed description when taken in conjunction with the accompanying drawings, in which:

DETAILED DESCRIPTION OF THE EMBODIMENTS

Figure 1:
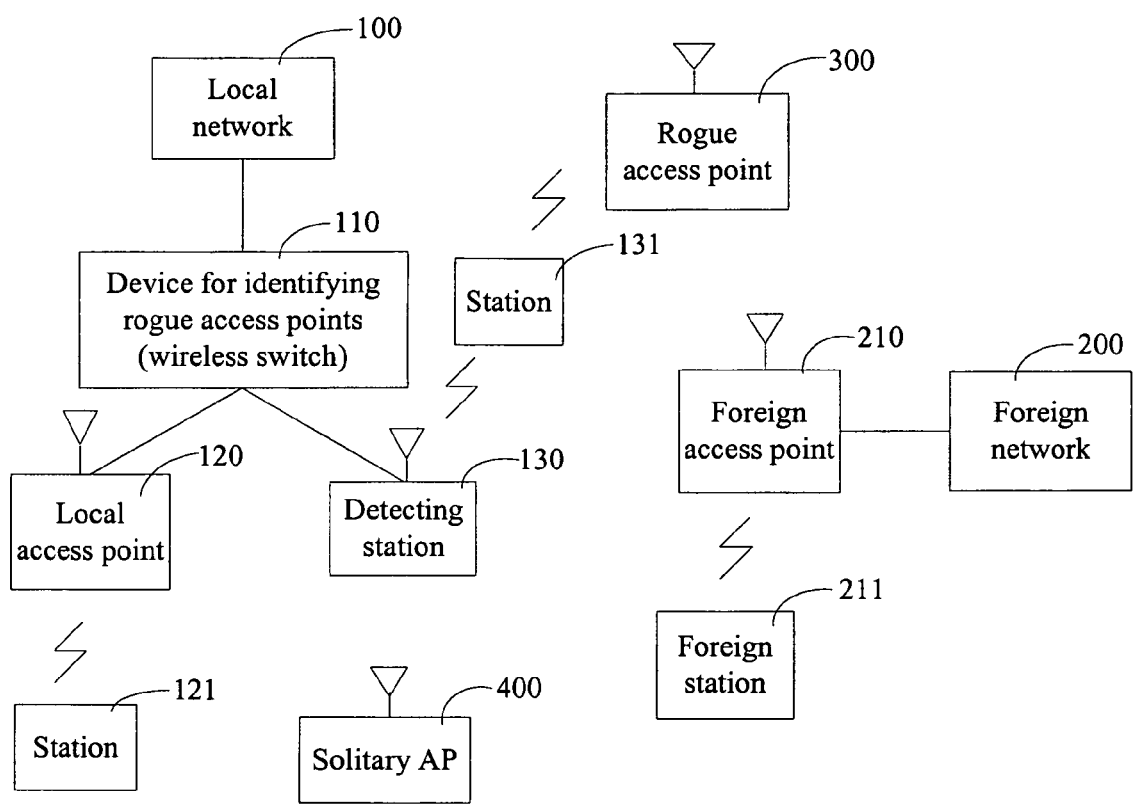
FIG. 1 is a schematic diagram of a system for detecting rogue access points according to an exemplary embodiment of the present invention, together with an exemplary application environment of the system.

FIG. 1 is a schematic diagram of a system for detecting rogue access points (APs) according to an exemplary embodiment of the invention, together with an exemplary application environment of the system. In the exemplary embodiment, the system includes a device for identifying rogue access points 110, and a plurality of detecting stations 130 (only one shown). The exemplary application environment includes a local network 100, a plurality of local access points 120 (only one shown), a plurality of stations 121, 131, a foreign network 200, a foreign access point 210, a foreign station 211, a rogue access point 300, and a solitary access point 400. The stations 121, 131 and the foreign station 211 are clients that can be connected to the local wireless network 100. Such clients may for example be mobile, handheld, or immobile clients, such as notebook computers, mobile telephones, personal digital assistants (PDAs), etc. The local network 100, local access points 120, stations 121, 131, solitary access point 400, device 110 and detecting stations 130 typically belong to an organization such as a company that implements the system (hereinafter, "implementing company"). The foreign station 211, foreign access point 210 and foreign network 200 typically belong to another organization such as a company that is physically located near the company that implements the system (hereinafter, "neighboring company").

The device for identifying rogue access points 110 is connected to the local network 100 in the implementing company by a wired connection. In the exemplary embodiment, the device for identifying rogue access points 110 may be a wireless switch or another kind of wireless device. Hereinafter, for the purposes of conveniently describing the exemplary embodiment, it is assumed that the device for identifying rogue access points 110 is a wireless switch 110. The local access point 120 and the detecting station 130 are both connected to the wireless switch 110 by a wired connection. The station 121 is wirelessly connected to the local access point 120. The station 131 is wirelessly connected to the detecting stations 130.

In the exemplary embodiment, the detecting station 130 is an access point, and scans access points and stations associated with the access points. Thereby, an AP list and an association list within the scope of the detecting station 130 can be compiled. The detecting station 130 transmits the AP list and the association list to the wireless switch 110. The AP list includes all access points within the scope of the detecting station 130, and the association list includes a plurality of associated stations that correspond to the access points in the AP list. The wireless switch 110 receives the AP list and the association list, and determines whether each access point in the AP list is a rogue access point.

The foreign access point 210 is connected to the foreign network 200 in the neighboring company by a wired connection, and the foreign station 211 is wirelessly connected to the foreign access point 210. In the exemplary application environment, the foreign access point 210 is assumed to be within the scope of the detecting station 130. The solitary access point 400 is a newly installed access point without any station connected thereto, and is also within the scope of the detecting station 130.

In the exemplary application environment, when the station 131 unknowingly communicates with the rogue access point 300 within the scope of the detecting station 130, network intruders can steal confidential information from the station 131 via the rogue access point 300. Therefore the detecting station 130 needs to scan the access points and stations associated with the access points, in order to compile an AP list and an association list of access points and their associated stations within the scope of the detecting station 130. The detecting station 130 then transmits the AP list and the association list to the wireless switch 110. The wireless switch 110 receives the AP list and the association list, and determines whether each access point in the AP list is a rogue access point. In the exemplary embodiment, the wireless switch 110 determines whether each access point in the AP list is pre-authorized, whether the access point is directly connected to the wireless switch 110, whether the access point has an associated client, and whether the associated client is in an effective client list, so as to determine whether the access point is a rogue access point. If an access point is not pre-authorized, the access point is not directly connected to the wireless switch 110, the access point has an associated client, and the associated client is in the effective client list, then the access point is determined to be a rogue access point. Therefore, the wireless switch 110 can identify that the rogue access point 300 is just that. The wireless switch 110 then informs operators to deal with the rogue access point 300, in order to avoid "attacks" by the rogue access point 300 on the local network 100.

Figure 2:
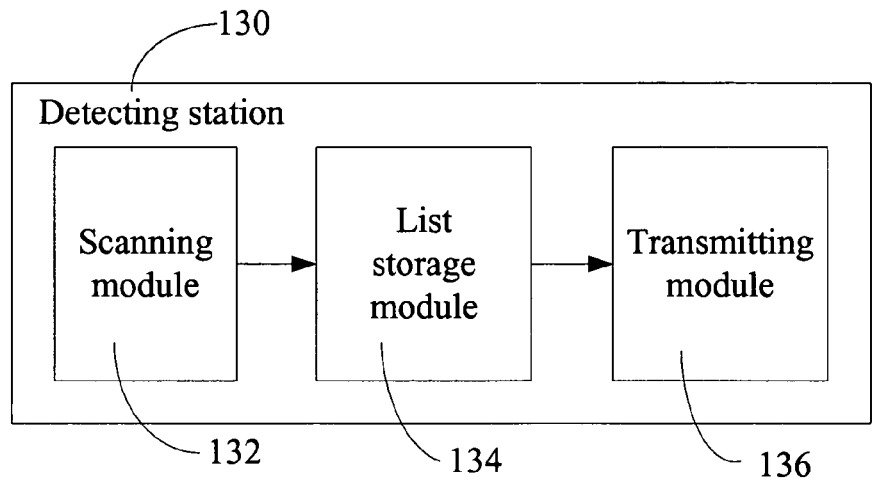
FIG. 2 is a schematic diagram of functional modules of a detecting station of the system of FIG. 1.

FIG. 2 is a schematic diagram of functional modules of the detecting station 130. In the exemplary embodiment, the detecting station 130 includes a scanning module 132, a list storage module 134, and a transmitting module 136. The scanning module 132 is used for scanning access points and stations associated with the access points, in order to compile an AP list and an association list within the scope of the detecting station 130. In the exemplary embodiment, the scanning module 132 scans beacon frames in every channel to compile the AP list by a passive scan, and scans association frames in every channel to compile the association list by the passive scan. The association frames include data frames, management frames, and control frames. The list storage module 134 is used for storing the results of scanning by the scanning module 132; that is, the list storage module 134 is used for storing the AP list and the association list. The transmitting module 136 is used for generating a detection report including the AP list and the association list, and for transmitting the detection report to the wireless switch 110.

Figure 3:
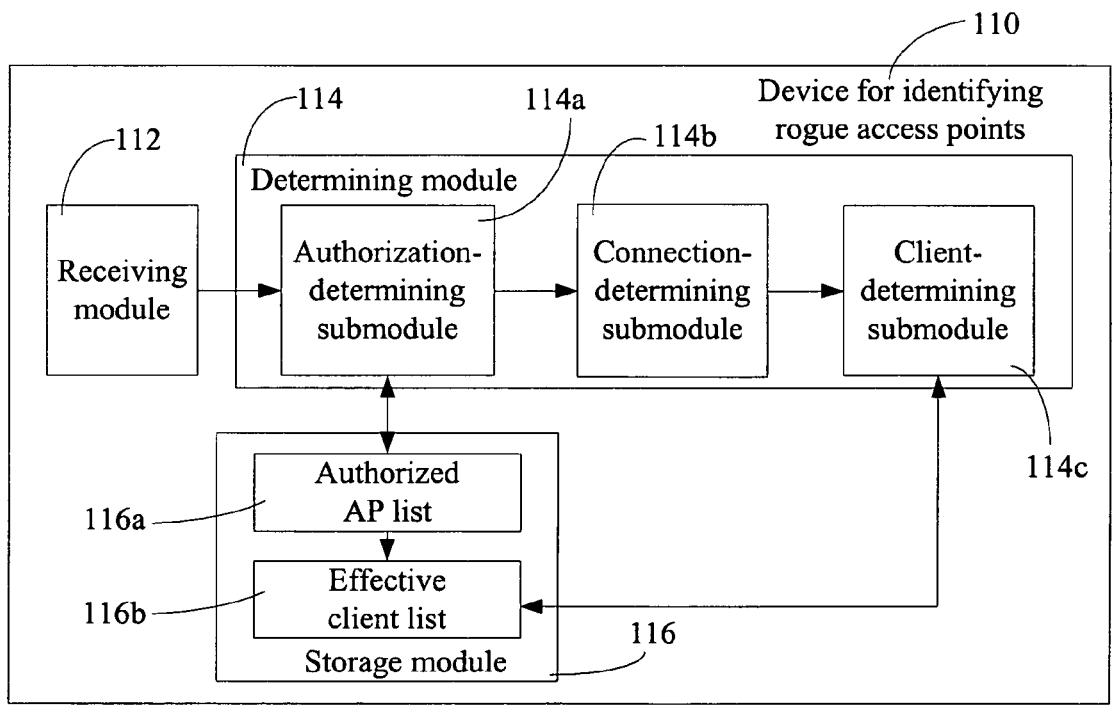
FIG. 3 is a schematic diagram of functional modules of a device for identifying rogue access points of the system of FIG. 1.

FIG. 3 is a schematic diagram of functional modules of the device for identifying rogue access points 110; that is, the wireless switch 110. In the exemplary embodiment, the wireless switch 110 includes a receiving module 112, a determining module 114, and a storage module 116. The receiving module 112 is used for receiving the detection report sent by the detecting station 130, and for transmitting the AP list and the association list of the detection report to the determining module 114. The storage module 116 is used for storing an authorized AP list 116a and an effective client list 116b. The authorized AP list 116a includes a list of access points authorized by the wireless switch 110, and the effective client list 116b includes a list of effective clients of the wireless switch 110. The storage module 116 is also used for adding the associated stations of the authorized access points to the effective client list 116b. The determining module 114 includes an authorization-determining sub-module 114a, a connection-determining sub-module 114b, and a client-determining sub-module 114c.

The authorization-determining sub-module 114a is used for determining whether each access point in the AP list is pre-authorized, and for transmitting information on unauthorized access points and associated stations thereof to the connection-determining sub-module 114b. In the exemplary embodiment, the authorization-determining sub-module 114a determines whether the access point is in the authorized AP list 116a in order to determine whether the access point is pre-authorized. If the access point is in the authorized AP list 116a, the access point is pre-authorized; that is, the access point is not a rogue access point. If the access point is not in the authorized AP list 116a, the access point is not pre-authorized and therefore may be a rogue access point.

The connection-determining sub-module 114b is used for determining whether each unauthorized access point is directly connected to the wireless switch 110, and for transmitting information on unauthorized and not directly connected access points and associated stations thereof to the client-determining sub-module 114c. In the exemplary embodiment, the wireless switch 110 sends an Address Resolution Protocol (ARP) request to each access point. If the access point gives a reply to the request by sending back an ARP reply, the connection-determining sub-module 114b determines that the access point is directly connected to the wireless switch 110; that is, the access point is not a rogue access point. If the access point does not give a reply to the request, the connection-determining sub-module 114b determines that the access point is not directly connected to the wireless switch 110 and therefore may be a rogue access point.

The client-determining sub-module 114c is used for determining whether each unauthorized and not directly connected access point has an associated client, and for further determining whether the associated client is in the effective client list 116b. In the exemplary embodiment, the client-determining sub-module 114c determines whether the access point has an associated client according to the associated station of the access point. If the access point does not have an associated station, the access point does not have an associated client; that is, the access point is not a rogue access point. If the access point has an associated station, the access point has an associated client, and then the client-determining sub-module 114c further determines whether the associated client is in the effective client list 116b. If the associated client is not in the effective client list 116b, the access point is not a rogue access point. If the associated client is in the effective client list 116b, the access point is a rogue access point.

Figure 4:
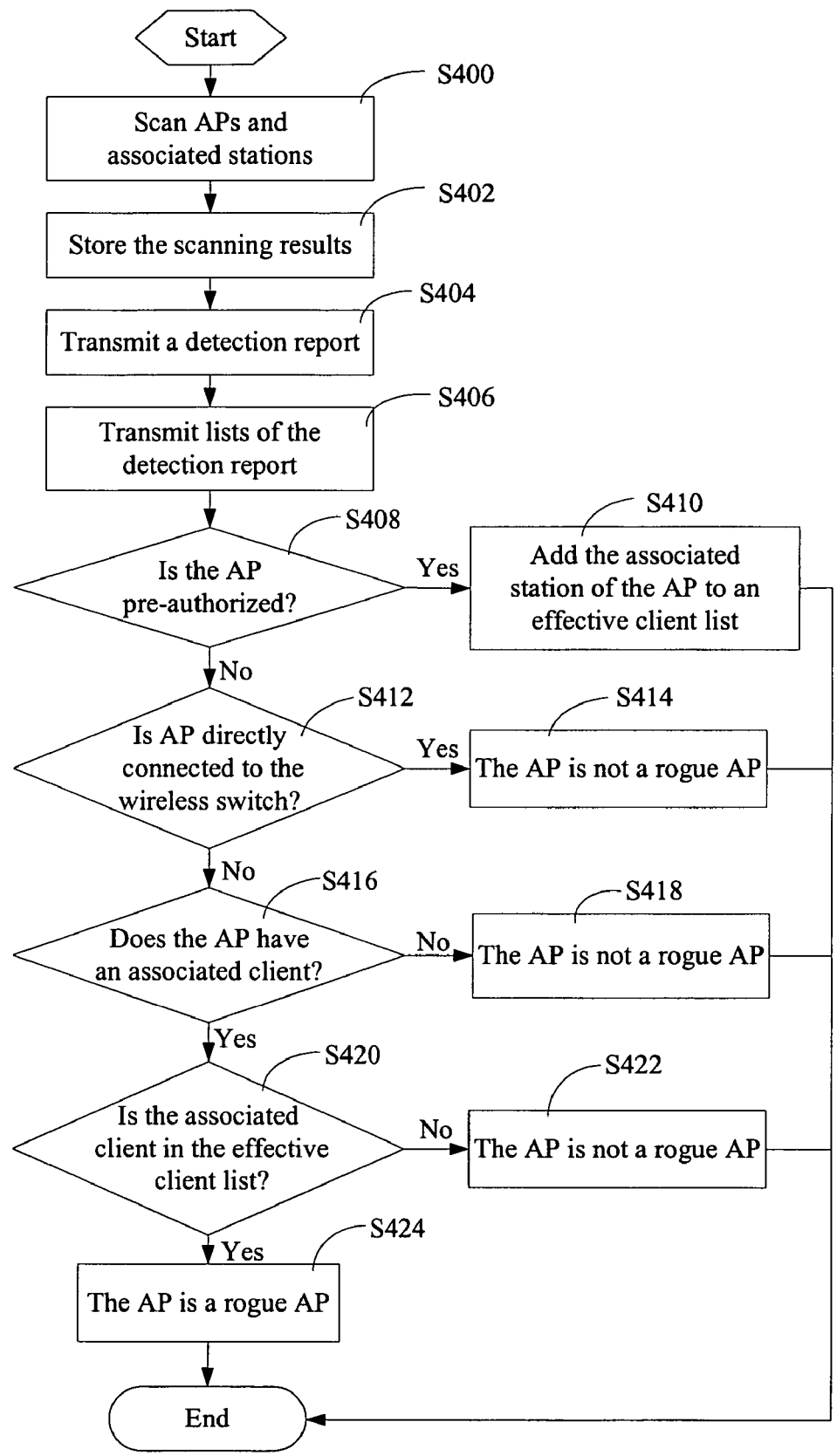
FIG. 4 is a flowchart of a method for detecting rogue access points, according to another exemplary embodiment of the present invention.

FIG. 4 is a flowchart of a method for detecting rogue access points, according to an exemplary embodiment of the invention. In the exemplary embodiment, it is necessary to detect and identify rogue access points in order to avoid attacks by the rogue access points on the local network 100.

In step S400, the scanning module 132 of the detecting station 130 scans access points and stations associated with the access points, in order to compile an AP list and an association list within the scope of the detecting station 130. In the exemplary embodiment, the scanning module 132 scans beacon frames in every channel to compile the AP list by a passive scan, and scans association frames in every channel to compile the association list by the passive scan. The association frames include data frames, management frames, and control frames.

In step S402, the list storage module 134 of the detecting station 130 stores the results of scanning by the scanning module 132; that is, the list storage module 134 stores the AP list and the association list.

In step S404, the transmitting module 136 of the detecting station 130 generates a detection report according to the AP list and the association list in the list storage module 134, and transmits the detection report to the wireless switch 110. In the exemplary embodiment, the detection report includes the AP list and the association list.

In step S406, the receiving module 112 of the wireless switch 110 receives the detection report transmitted by the detecting station 130, and transmits the AP list and the association list of the detection report to the authorization-determining sub-module 114a of the determining module 114.

In step S408, the authorization-determining sub-module 114a determines whether each access point in the AP list is pre-authorized, and transmits information on unauthorized access points and associated stations thereof to the connection-determining sub-module 114b. In the exemplary embodiment, the authorization-determining sub-module 114a determines whether the access point is pre-authorized by determining whether the access point is in the authorized AP list 116a.

If the access point is in the authorized AP list 116a, the access point is pre-authorized. Accordingly, in step S410, the storage module 116 adds the associated station of the access point to the effective client list 116b, and the procedure is completed in respect of the access point.

If the access point is not in the authorized AP list 116a, the access point is not pre-authorized. In such case, in step S412, the connection-determining sub-module 114b determines whether the unauthorized access point is directly connected to the wireless switch 110, and transmits information on unauthorized and not directly connected access points and associated stations thereof to the client-determining sub-module 114c. In the exemplary embodiment, the wireless switch 110 sends an Address Resolution Protocol (ARP) request to the access point.

If the access point gives a reply to the request by sending back an ARP reply, the connection-determining sub-module 114b determines that the access point is directly connected to the wireless switch 110. Accordingly, in step S414, the connection-determining sub-module 114b determines that the access point is not a rogue access point, and the procedure is completed in respect of the access point.

If the access point does not give a reply to the request, the connection-determining sub-module 114b determines that the access point is not directly connected to the wireless switch 110. In such case, in step S416, the client-determining sub-module 114c determines whether the unauthorized and not directly connected access point has an associated client. In the exemplary embodiment, the client-determining sub-module 114c determines whether the access point has an associated client according to an associated station (if any) of the access point.

If the access point does not have an associated station, the access point does not have an associated client. Accordingly, in step S418, client-determining sub-module 114c determines that the access point is not a rogue access point, but rather a solitary access point such as the solitary access point 400 (see FIG. 1). Thus the procedure is completed in respect of the access point.

If the access point has an associated station, the access point has an associated client. In such case, in step S420, the client-determining sub-module 114c further determines whether the associated client is in the effective client list 116b.

If the associated client is not in the effective client list 116b, in step S422, the client-determining sub-module 114c determines that the access point is not a rogue access point, and the procedure is completed in respect of the access point. In the exemplary embodiment, in this situation, the access point is a foreign access point such as the foreign access point 210 (see FIG. 1). Thus the procedure is completed in respect of the access point.

If the associated client is in the effective client list 116b, in step S424, the client-determining sub-module 114c determines that the access point is a rogue access point. Thereupon, the wireless switch 110 informs operators to deal with the rogue access point, so as to avoid attacks by the rogue access point on the local network 100 (see FIG. 1).

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

I claim:

1. A method for detecting rogue access points, comprising the steps of:
   providing a detecting station and a device for identifying rogue access points;
       scanning access points (APs) and stations associated with the access points by the detecting station, in order to compile an AP list and an association list within the scope of the detecting station;
       transmitting the AP list and the association list from the detecting station to the device for identifying rogue access points; and
       determining whether each access point in the AP list is a rogue access point, according to the AP list and the association list, by the device for identifying rogue access points, wherein the determining step comprises;
       providing an effective client list, comprising a plurality of effective clients;
       determining whether each access point is pre-authorized;
       determining whether the access point is directly connected to the device for identifying rogue access points, if the access point is not pre-authorized;
       determining whether the access point has an associated client, if the access point is not directly connected to the device for identifying rogue access points;

determining whether the associated client is in the effective client list, if the access point has an associated client; and determining that the access point is a rogue access point, if the associated client is in the effective client list.

2. The method as claimed in claim 1, wherein the scanning step further comprises the step of scanning beacon frames in every channel to compile the AP list; and scanning association frames in every channel to compile the association list.

3. The method as claimed in claim 1, farther comprising the step of adding the associated station of the access point to the effective client list, if the access point is pre-authorized.

4. The method as claimed in claim 1, wherein if the access point is directly connected to the device for identifying rogue access points, the access point is not a rogue access point.

5. The method as claimed in claim 1, wherein if the access point does not have an associated client, the access point is not a rogue access point.

6. The method as claimed in claim 1, wherein if the associated client is not in the effective client list, the access point is not a rogue access point.

7. The method as claimed in claim 1, wherein the step of determining whether each access point is pre-authorized comprises the steps of:

providing an authorized access point list, comprising a plurality of authorized access points;

determining whether the access point is in the authorized access point list; and determining that the access point is pre-authorized, if the access point is in the authorized access point list.

8. The method as claimed in claim 1, wherein the step of determining whether the access point is directly connected to the device for identifying rogue access points comprises the step of:

sending an address resolution protocol (ARP) request from the device for identifying rogue access points to the access point; wherein if the access point gives a reply to the request by sending back an ARP reply, the access point is directly connected to the device for identifying rogue access points.

9. A system for detecting rogue access points, comprising:

a detecting station for scanning access points (APs) and stations associated with the access points, in order to compile an AP list and an association list within the scope of the detecting station, and for transmitting the AP list and the association list; and a device for identifying rogue access points, comprising a storage module, a receiving module and a determining module; wherein the storage module stores an effective client list which includes a list of effective clients, the receiving module receives the AP list and the association list, and the determining module comprises an authorization-determining sub-module for determining whether each access point in the AP list is pre-authorized, a connection-determining sub-module for determining whether an unauthorized access point is directly connected to the device for identifying rogue access points, and a client-determining sub-module for determining whether an unauthorized and not directly connected access point has an associated client, and if so, for determining whether the associated client is in the effective client list and determining the access point is a rouge access point if the associated client is in the effective client list.

10. The system as claimed in claim 9, wherein the device for identifying rogue access points comprises a wireless switch.

11. The system as claimed in claim 9, wherein the AP list comprises all access points within the scope of the detecting station, and the association list comprises a plurality of associated stations that correspond to the access points in the AP list.

12. The system as claimed in claim 9, wherein the detecting station comprises at least one of a scanning module for scanning the access points and the stations associated with the access points within the scope of the detecting station, a list storage module for storing the AP list and the association list, and a transmitting module for transmitting the AP list and the association list stored in the list storage module.

13. The system as claimed in claim 9, wherein the storage module is further for storing an authorized access point list which comprises a list of access points authorized by the device for facilitating identification of rouge access points.

14. The system as claimed in claim 13, wherein the authorization determining sub-module is further capable of determining whether the access point is in the authorized access point list, and determining that the access point is pre-authorized if the access point is in the authorized access point list.

15. A device for identifying rogue access points, comprising:

a storage module for storing an effective client list which includes a list of effective clients;

a receiving module for receiving an access point (AP) list and an association list; and a determining module for determining whether each access point in the AP list is a rogue access point according to the AP list and the association list, wherein the determining module comprises:

an authorization-determining sub-module for determining whether each access point in the AP list is pre-authorized;

a connection-determining sub-module for determining whether an unauthorized access point is directly connected to the device for identifying rogue access points; and a client-determining sub-module for determining whether an unauthorized and not directly connected access point has an associated client, and if so, for determining whether the associated client is in the effective client list and determining the access point is a rouge access point if the associated client is in the effective client list.

16. The device as claimed in claim 15, wherein the device comprises a wireless switch.

17. The device as claimed in claim 15, wherein the storage module is further capable of storing an authorized AP list.

18. The device as claimed in claim 17, wherein the authorization determining sub-module is further capable of determining whether the access point is in the authorized AP list, and determining that the access point is pre-authorized if the access point is in the authorized access point list.

* * * * *